March 30, 1971          B. RUDLOFF          3,573,124
PROCESS FOR THE MANUFACTURE OF MULTILAYER, COLD-MOLDABLE
AND THERMOFORMABLE COMPLEX OR SANDWICH
Filed April 20, 1967
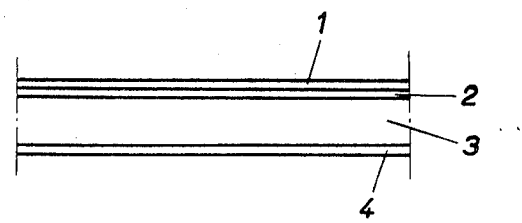
Inventor:
Bernard Rudloff
By: Ernest G. Montague
Attorney United States Patent Office 3,573,124
Patented Mar. 30, 1971

3,573,124
PROCESS FOR THE MANUFACTURE OF MULTI-LAYER, COLD-MOLDABLE AND THERMOFORMABLE COMPLEX OR SANDWICH
Bernard Rudloff, Marckolsheim, France
Filed Apr. 20, 1967, Ser. No. 632,363
Claims priority, application France, Oct. 17, 1966, 8,721
Int. Cl. B31f 1/00
U.S. Cl. 156—224                                        6 Claims

ABSTRACT OF THE DISCLOSURE

A method of manufacture of cold-moldable thermoformable sound-proofing complexes by associating with complexes formed by surfacing of bituminous products with layer of unwoven felts charged with different resins, a sheet of coldshapable impregnated cardboard including sheet metal, lead or aluminum thereby imparting to the complex a cold-shaping property, while retaining rigidity after cold-shaping permitting the subsequent passage through a furnace.

---

The present invention relates to sound-proofing and thermal-insulation coatings.

It is an object of the present invention to provide a process for the manufacture of a multilayer, cold-moldable and thermoformable complex or sandwich.

The present inventor has already effected the manufacture of unwoven felts charged especially with two or more resins having different fusion and polymerization points.

These felts charged with different resins are first of all treated for the polymerization, at the proper temperature of the resin having the lowest fusion point; this polymerization imparts to the felts a sufficient mechanical strength for their handling and for the subsequent surfacing or treatment operations.

These felts can be surfaced by, or associated with, bituminous products of all kinds, whether or not fusible at high temperature, in order thus to obtain very flexible multilayer sandwiches or complexes which can easily follow accurately the reliefs of the shapes of objects of all kinds, especially of stamped metal sheets. Once in position, these complexes are subjected to a higher temperature in order to effect the polymerization of the resins of higher fusion point, which in general is that of a painting tunnel or a baking stove. This baking permits on the one hand the welding of the layer of bitumen of the complex upon the objects to be lined and on the other the baking of the felts, which terminates in imparting a definitive shape to the whole. The shaped complex thus becomes integral with the parts to be treated.

With a view to rendering the positioning of these sound-proofing or insulating complexes much it is an object of the present invention provide a new technique permitting of shaping them in the cold state, by virtue of the association, with these multilayer complexes, constituted by felts of all kinds, sheets or bitumen or other materials, or a sheet of cold-shapable impregnated cardboard, or of another nature including for example sheet metal, lead or aluminium. This association of the cold-shapable sheet inside, outside or on each side of the multilayer complex confers upon the latter the faculty of being shaped in the cold state and of preserving, after shaping, all its rigidity, thus rendering it indeformable.

This new technique permits the lining and covering of all objects of all types, such as especially flat or stamped metal sheets, or apparatuses of all kinds having especially complicated reliefs. The placing of these multilayer complexes becomes easier as their cold pre-forming permits the close following of the smallest angles and the sharpest roundings, without leaving any gap between the complex and the object to be covered.

With these and other objects in view, which will become apparent in the following detailed description, the present invention will be clearly understood in conjunction with the accompanying drawing, in which the only figure is a diagrammatic view of a multi-layer complex in accordance with the present invention.

Referring now to the drawing, a cold-moldable or cold-modelable complex is constituted by a sheet 1 of fusible bitumen, which may or may not be self-adhesive in the cold state and is fusible at 120° C., a sheet of preferably impregnated cardboard 2 which is cold-shapable and is stuck to the sheet 1, an unwoven felt 3 charged with two kinds of resins having different fusion points and stuck to the cardboard sheet 2, and a vinyl felt 4 having a coating weight of 1.8 kg. per sq. metre, stuck to the felt 3.

Thus the present complex is formed by different materials stuck to one another, the nature, density and thickness of which can vary infinitely. All these layers constitute a rigid, multilayer assembly, the rigidity of which is due to the cardboard, or sheet of other material, 2, which moreover can be placed between two other layers and the assembling of which can be effected by the use of any type of glue, but more especially by means of a glue which after drying forms a flexible film.

The multilayer complex is then shaped with the aid of a two-part mold which is mounted on a press which can develop a thrust varying from 30 to 70 kg. per sq. cm., between the jaws of which it is introduced. Advantageously it can be cut out in advance to the external dimensions of the part to be covered, once cold-shaped.

The movement of the hydraulic press takes place at decreasing speed and the complex is kept under pressure in the mold during the time which, according to the nature of the materials, appears best selected for the shaping. During pressing the various materials go into place, especially the fibrous materials such as felts and cardboard. When the pressing time has elapsed, removal from the mold is effected and the desired cold-molded, very rigid and nondeformable piece is obtained.

The tool or mold can be equiped on its periphery with a vertical knife of blade form for cutting out the format from the complex, at the end of the stroke, while the pressure at the same time imparts the final appearance. The blade can be replaced by a setting device for the production of a sealed cold-molded piece.

These complexes can of course subsequently be treated by appropriate painting, lacquering or perforating surface treatment, according to the nature of the materials placed at the exterior of the complexes. The latter can constitute acid-proof and grease-proof coverings, while still retaining their sound-proofing and insulating properties.

When ready for positioning, the complexes are especially designed to fit and line the parts of apparatuses or of coachwork plates which are treated in baths before receiving their final paintwork. They are utilized in automobile construction, in bodywork assembly lines, especially as they, being preformed, very advantageously replace the very numerous sound-proofing or insulating lining parts which require significant labour for placing in position.

Finally these complexes, which preferably contain a felt charged with resins having different fusion points, possess the advantage, once cold-preformed, of being capable of being positioned in bodywork shells and then conducted with the bodywork shell assembly through the painting ovens. The bituminous layer in contact with the metal plate welds and becomes integral therewith, while the resins contained in the felt polymerise and thus are set and baked. Thus at emergence from the oven the part is finished and hot-shaped.

The same applies as regards the treatment of all kinds of industrial and domestic applicances which are thus improved by a sound-proofing or thermally insulating lining, hot or cold.

The new process for the manufacture of sound-proofing or insulating complexes permits of infinite variation of the possibilities and applications, especially in the field of automobile sound-proofing and in the actual construction of industrial or domestic apparatus, and is especially noteworthy for the fact that is must effect a considerable economy in labor by reason of the facility of its preforming by cold moulding or modeling, in the covering of the most various pieces having complicated contours. Moreover, the complexes produced by its utilization can also be finished, on their visible side, with fabrics, moquettes, P.V.C.-coated felts, rubbers, etc.

It is also possible to conceive of cold-formable pieces baked in a second stage, for the production of pallets for the handling of fragile objects, commercial packages of all kinds, or thermal insulation shells.

While the present process is applied by way of preference to a complex comprising an unwoven felt charged with two kinds of resins having different fusion points, it could also apply to a complex comprising an unwoven felt which does not possess this characteristic, or to a complex comprising a felt of another type, such as a fulled felt or a needled felt.

I claim:

1. A process for the manufacture of cold-moldable or cold-modelable and thermoformable sound-proofing complexes, comprising the steps of forming a multilayer complex with a fusible bituminous layer and a layer of unwoven felts charged with different thermal formable resins having different points of fusion and polymerization and adhesively disposing a sheet of cold-shapable material to and between said bituminous layer and said layer of unwoven felts, respectively, and selected from the group consisting of impregnated cardboard, sheet metal, lead and aluminum, and adhering a vinyl felt layer to the free side of said layer of unwoven felts, and cold-shaping said multilayer complex, retaining after said shaping, a rigidity which renders said multilayer complex undeformable, said cold shaping effecting a close following of the shape of said multilayer complex to the shape of an object to be covered.

2. A process for the manufacture of cold-moldable or cold-modelable and thermoformable sound-proofing complexes, comprising the steps of forming a multilayer complex comprising, adhering a fusible bituminous exterior layer onto an impregnated cardboard, adhering to the free side of said impregnated cardboard an unwoven felt charged with thermal formable resins, adhering a vinyl felt to the free side of said unwoven felt, cutting out a portion of said multilayer complex to the dimensions of an object to be covered, and cold-shaping same by placing said multilayer complex between the jaws of a mold subjected to the thrust of a press, said multilayer complex retaining, after said shaping, a rigidity which renders said multilayer complex undeformable.

3. The process, as set forth in claim 1, further comprising the steps of positioning said cold-shaped multilayer complex on said object to be covered with the bituminous layer thereagainst.

4. The process, as set forth in claim 3, further comprising the steps of passing said object with said cold-shaped multilayer complex thereon into a heating device.

5. The process, as set forth in claim 2, further comprising the steps of positioning said cold-shaped multilayer complex on said object to be covered with the bituminous layer thereagainst.

6. The process, as set forth in claim 5, further comprising the steps of passing said object with said cold-shaped multilayer complex thereon into a heating device.

References Cited

UNITED STATES PATENTS

| 2,006,232 | 6/1935 | Upson | 161—224 |
| 2,180,305 | 11/1939 | Groskopf | 161—224X |
| 2,636,543 | 4/1953 | Groskopf | 161—224X |
| 2,748,043 | 5/1956 | Mullen | 161—224X |
| 2,774,685 | 12/1956 | Carnegie, Jr. | 161—236 |

SAMUEL W. ENGLE, Primary Examiner

U.S. Cl. X.R.

161—224, 236